Feb. 9, 1971  R. J. BINDER  3,562,681
INDICATOR DEVICE WITH MAGNETIC SWITCH CLOSURE
Filed Dec. 11, 1968
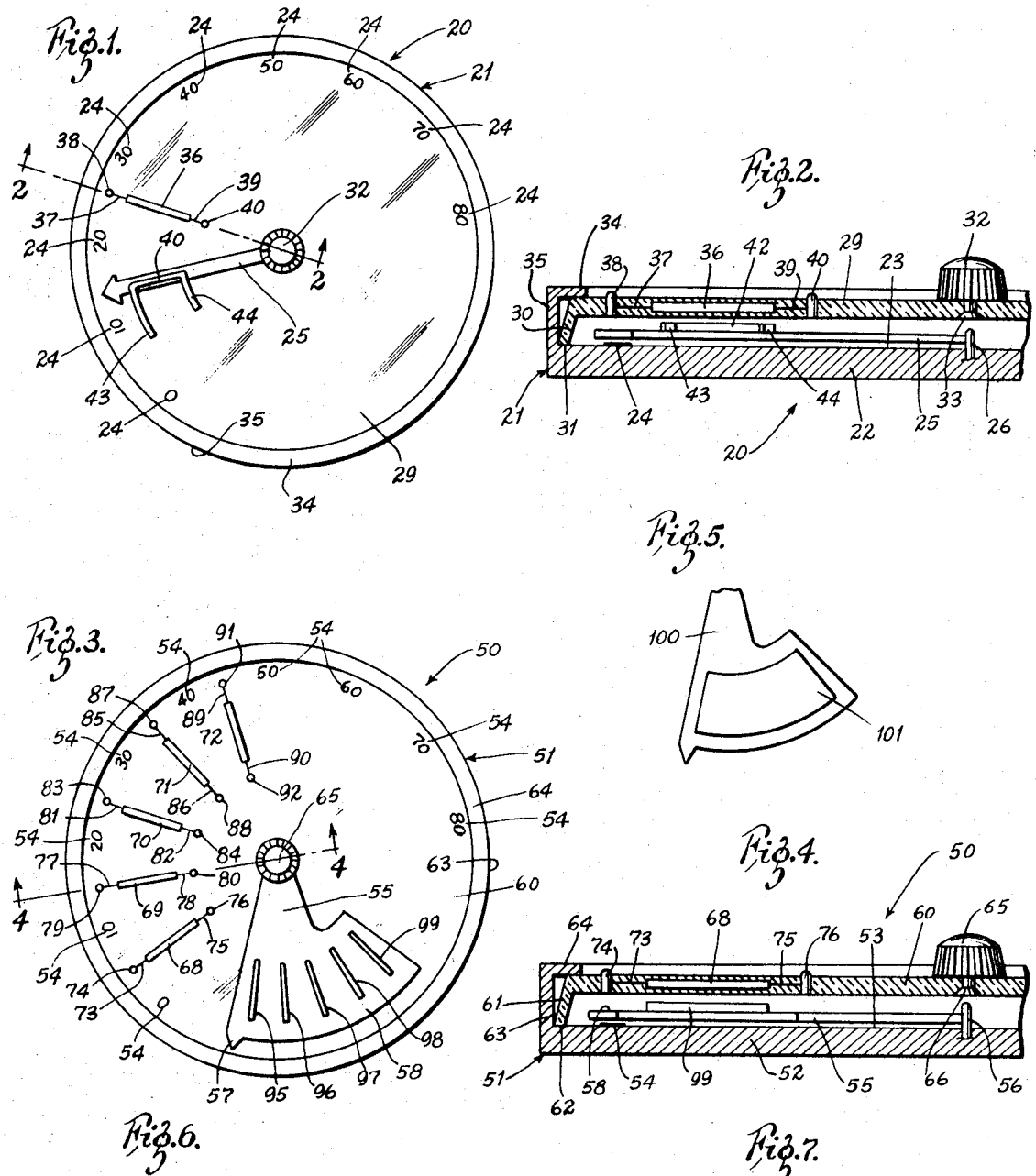
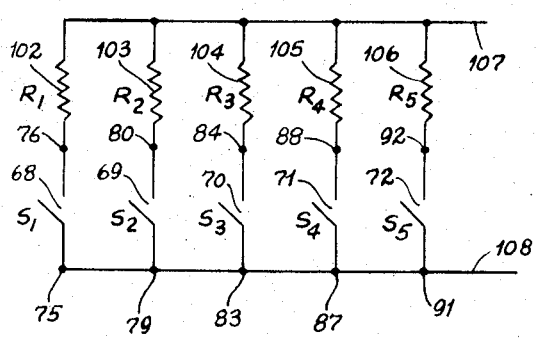
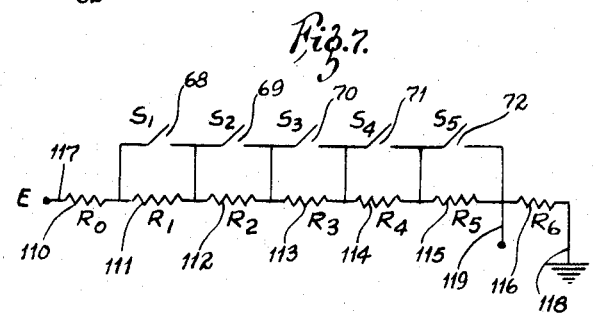
INVENTOR:
RICHARD J. BINDER,
By Kingsland, Rogers, Ezell, Eilers + Robbins
ATTORNEYS United States Patent Office 3,562,681
Patented Feb. 9, 1971

3,562,681
INDICATOR DEVICE WITH MAGNETIC
SWITCH CLOSURE
Richard J. Binder, 220 Cannonbury Drive,
St. Louis, Mo. 63119
Filed Dec. 11, 1968, Ser. No. 798,841
Int. Cl. H01h 73/12
U.S. Cl. 335—17     8 Claims

ABSTRACT OF THE DISCLOSURE

A movable magnet carrying member; a dial having one or more switches in the path of the moving magnetic field produced by the moving magnet. The switches are actuated in response to the presence of a sufficiently high magnetic field to operate a control circuit. The dial is movable to vary the locations of the switches.

BRIEF DESCRIPTION OF THE INVENTION

A movable member, such as a pointer on an indicator device, carries one or more permanent magnets on it. A cover for the indicator device is transparent and carries one or more magnetic reed switches, preferably embedded in the transparent cover. The cover is mounted for rotation to vary the positions of the reed switches and thereby vary the movement of the pointer required to position the one or more magnets beneath the one or more reed switches. In one embodiment, a single reed switch is actuated by a single magnet. The magnet has extensions of its poles to maintain a "memory" magnetic field for a predetermined swing of the magnet beyond the switch. In another embodiment, there is a plurality of reed switches actuated successively by a plurality of magnets. The reed switches may be connected into any of several different kinds of control circuits. If desired, in either embodiment, the positions of the components may be reversed with the reed switch or switches mounted on the pointer and the magnet or magnets mounted on the dial. Also, in place of the magnet with its extensions or in place of the plurality of magnets, there may be a single wide magnet having its poles oriented the same way as the poles of the plurality of magnets. Also, the circular scale and rotatable pointer may be replaced by a straight scale and sliding pointer with the reed switch or switches and the magnet or magnets parallel to one another.

BRIEF DESCRIPTION OF THE DRAWINGS

FIG. 1 is a front view of the indicator device.
FIG. 2 is an enlarged view in section taken along the line 2—2 of FIG. 1, but with the pointer moved to a position at which the magnet it carries is located beneath the reed switch.
FIG. 3 is a front elevation view of another form of indicator device.
FIG. 4 is an enlarged view in section taken along the line 4—4 of FIG. 3, but with the pointer moved to a position at which one of its magnets is located beneath one of the reed switches.
FIG. 5 is a fragmentary front view of another form of magnet as carried by a pointer.
FIG. 6 is a schematic wiring diagram showing one circuit connection for the magnetic reed switches of FIG. 3.
FIG. 7 is a schematic wiring diagram showing another connection for the magnetic reed switches of FIG. 3.

DETAILED DESCRIPTION OF THE INVENTION

The indicator device 20 shown in FIGS. 1 and 2 has a housing 21 that contains any suitable sensing apparatus (not shown) such as apparatus for sensing variations in temperature, pressure or any other parameter. The base 22 of the housing 21 has a face 23 that may have a graduated scale of numbers 24 printed or formed on it. A needle 25 is mounted on a post 26 to rotate past the scale of numbers 24 as the temperature, pressure or other parameter varies.

A transparent plastic or glass dial 29 has an annular skirt 30, the lower edge 31 of which bears against the face 23 of the base 22. A knob 32 is connected by a suitable pin 33 to the center of the dial 29 to rotate the dial 29. The dial 29 is held in place by an annular flange 34 projecting inwardly from a sidewall 35 of the housing 21. The flange 34 and sidewall 35 position the dial 29 while permitting it to be rotated by rotation of the knob 32.

A reed switch 36 of the kind that is sensitive to the presence of a magnetic field and closes under the influence of the magnetic field is embedded in the dial 29. A conductor 37 leads from one side of the switch 36 to a terminal post 38. Another conductor 39 leads from the other side of the reed switch 36 to another terminal post 40.

A magnet 42 is permanently affixed to the pointer 25. The magnet 42 has trailing arcuate arms 43 and 44 that are parallel to the face 23 of the housing 21 and serve to extend the poles of the magnet 42 to elongate the magnetic field.

In the operation of the indicator of FIG. 2, the terminals 38 and 40 are wired to any responsive device, such as an appropriate alarm, if it is desired to indicate passage of the pointer 25 beyond a predetermined indicated value. Alternatively, the terminals 38 and 40 may be wired to a switching device to close an external circuit or may be otherwise connected as desired.

The transparent disc 23 is rotated to position the reed switch 36 at any position. The resistance to rotation is such that the disc 23 will remain in the selected position until again rotated by rotation of the knob 32. Alternatively, a suitable set screw may be provided to positively lock the disc 29 in a selected position.

As the needle 25 rotates with variations in the pressure, temperature or other parameter being measured, it moves the magnet 42 and the trailing arms 43 and 44. So long as the needle 25 does not rotate to a position beneath the reed switch 36, the reed switch 36 will remain open. For example, if the normal operating range of the parameter being sensed would be a range below the position of the reed switch 36, the reed switch 36 will remain open during operations within this normal range.

If the pressure, temperature or other parameter being sensed increases above the normal range, the needle 25 will rotate to a position at which the magnet 42 is located directly beneath the reed switch 36. In this location of the magnet 42, the magnetic field is strong enough to close the reed switch 36 and close its external circuit. If the needle then moves toward a lower indicator position, the magnet 42 will be withdrawn from beneath the reed switch 36 and the reed switch will again open. If, on the other hand, the needle 25 moves toward a higher indicator value, the magnet 42 moves beyond the reed switch 36. However, the reed switch 36 does not open because the trailing arms 43 and 44 remain beneath the reed switch 36 and maintain the magnetic field strength sufficiently high to prevent the reed switch 36 from opening. Thus, the trailing arms 43 and 44 provide a memory to keep the reed switch 36 closed even though the pointer 25 has moved beyond the reed switch 36 to a higher indicator value.

The trailing arms 43 and 44 may be of any desired length according to the range of movement of the needle 25 desired for keeping the reed switch 36 closed. These effects of the trailing arms 43 and 44 may be obtained by a magnet of extended geometry as shown in FIG. 5 and described hereinafter.

FIGS. 3 and 4 illustrate another form of indicator device 50. The indicator device 50 may have some components that are similar to or identical to those of the indicator 20, such as a housing 51 and a base 52 having a face 53 with a suitable scale of numbers 54. A pointer 55 is mounted on a post 56 to rotate as temperature, pressure or any other parameter varies with the point 57 on the pointer 55 pointing to the number of the scale of numbers 54 corresponding to a sensed value. The pointer has a plate 58 trailing the point 57 and lying parallel to the face 53.

A transparent dial 60 has an annular downwardly depending skirt 61 the lower edge 62 of which bears against the face 53 of the base 52. A side wall 63 that extends upwardly from the base 52 and an inwardly extending annular shoulder 64 cooperate to hold and guide the transparent dial 60 for rotational movement. A knob 65 is fastened by any suitable pin connection 66 to the center of the dial 60 to facilitate rotation of the dial.

There is a plurality of reed switches 68, 69, 70, 71 and 72 embedded in the transparent dial 60. The reed switches 68, 69, 70, 71 and 72 project radially from the center of the dial 60 and are circumferentially spaced from one another as shown in FIG. 3. Opposite ends of the reed switch 68 are connected by wires 73 and 74 to terminal posts 75 and 76. Likewise, opposite ends of the reed switch 69 are connected by wires 77 and 78 to terminal posts 79 and 80, opposite ends of the reed switch 70 are connected by wires 81 and 82 to terminal posts 83 and 84, opposite ends of the reed switch 71 are connected by wires 85 and 86 to terminal posts 87 and 88, and opposite ends of the reed switch 72 are connected by wires 89 and 90 to terminal posts 91 and 92.

There is a plurality of magnets 95, 96, 97, 98, and 99 affixed to the indicator 55. The magnets 95, 96, 97, 98 and 99 are oriented in a radial direction from the center of the dial 60 and are circumferentially spaced from one another. Each magnet 95, 96, 97, 98 and 99 produces a sufficiently strong magnetic field to close any one of the reed switches 68, 69, 70, 71 or 72, when positioned below such reed switch.

In the operation of the indicator 50, the dial 60 is rotated to any desired position. When the dial 60 is rotated, the reed switches 68, 69, 70, 71 and 72 revolve about the center of the dial 60.

So long as the indicator 55 swings through an arc in the scale below the set position of the reed switches 68 through 72, all of the reed switches remain open. However, when the indicator 55 swings to a position at which the magnet 95 is located beneath the reed switch 68, the reed switch 68 closes. As the indicator swings further in a clockwise direction, the magnet 95 moves beyond the reed switch 68 to a position between the switches 68 and 69. However, the strength of the magnetic field from the two magnets 95 and 96 is adequate to keep the reed switch 68 closed. Since the magnetic field influencing the reed switch 69 comes only from the magnet 95, and since that field is weak inasmuch as the magnet 95 is not positioned directly beneath the reed switch 69, the reed switch 69 remains open. As the indicator 55 swings still further in a clockwise direction, the magnet 95 passes beneath the reed switch 69 and closes the reed switch 69. This positions the magnet 96 directly below the reed switch 68 to maintain the reed switch 68 closed. Therefore, both switches 68 and 69 are now closed.

Further movement of the indicator 55 in a clockwise direction keeps the reed switches 68 and 69 closed and the other reed switches 70, 71 and 72 open until the leading magnet 95 moves directly beneath the reed switch 70. Then the reed switch 70 closes while the reed switches 68 and 69 remain closed. In similar fashion, the reed switches 71 and 72 are successively closed as the leading magnet 95 moves directly beneath them.

The remaining reed switches 68 through 71 will remain closed as long as the leading magnet 95 does not move beyond the reed switch 72 in a clockwise direction. When the indicator 55 moves still farther in a clockwise direction, the trailing magnet 99 will be moved beyond the reed switch 68 and, since its magnetic field strength is not sufficiently high, the reed switch 68 will open, the remaining reed switches 69, 70, 71 and 72 remaining closed. Similarly, the reed switches 69, 70, 71 and 72 will be successively opened as the indicator 55 continues to move in a clockwise direction to successive positions at which the trailing magnet 99 is beyond those reed switches 69, 70, 71 and 72 in a clockwise direction.

Also, the reed switches 68, 69, 70, 71 and 72 will be opened in the reverse order of their closing as the indicator 55 moves in a counter-clockwise direction from a position at which the magnets 95, 96, 97, 98 and 99 are located directly beneath the reed switches 72, 71, 70, 69 and 68, respectively.

The foregoing assumes that the circumferential spacing between the switches 68, 69, 70, 71 and 72 is the same as the spacing between the magnets 95, 96, 97, 98 and 99. For variations in desired operating results, these relative spacings may be varied as required.

Since this indicator device senses continuously varying parameter values and actuates a step function switch array, it may be regarded as an analog to digital converter. The reed switches 68, 69, 70, 71 and 72 may be wired in any manner desired to any control devices desired whether they be resistors, capacitors, transistors or other components. The control components may be selected to produce step function variations as the reed switches are successively closed or successively opened, or to produce ramp function variations as the reed switches are successively closed or successively opened.

In FIG. 5, a pointer 100 carries a magnet 101 of extended geometry. This pointer 100 and the magnet 101 may be used in place of the pointer 25 and magnet 40 of FIG. 1 or in place of the pointer 55 and magnets 95 through 99 of FIG. 3. The direction of magnetization of the magnet 101 is the same as that of the magnet 40 and of the magnets 95 through 99.

FIGS. 6 and 7 illustrate two examples of connections that may be made for the reed switches 68, 69, 70, 71 and 72. In FIG. 6, the reed switch 68 is connected in series with a resistor 102. The reed switch 69 is connected in series with a resistor 103, the reed switch 70 is connected in series with a resistor 104, the reed switch 71 is connected in series with a resistor 105, and the reed switch 72 is conncted in series with a resistor 106. These connections may be made through the terminals 76, 80, 84, 88 and 92 respectively, and opposite sides of the resistors 102, 103, 104, 105 and 106 may be connected to a conductor 107 that leads to another part of a control circuit, including one side of a power supply. The other terminals 75, 79, 83, 87 and 91 are connected to another conductor 108 that leads to another part of the control circuit, including the other side of the power supply.

In FIG. 7, thre may be a plurality of resistors 110, 111, 112, 113, 114, 115 and 116, connected in series between conductors 117 and 118 that are connected across a potential difference. The reed switches 68, 69, 70, 71 and 72 are connected across the resistors 111, 112, 113, 114 and 115 respectively, and there is a conductor 119 connected between the resistors 115 and 116 that may lead to other parts of a control circuit for delivering variations in signals depending upon which of the switches 68, 69, 70, 71 and 72 are closed. In the circuit of FIG. 7 the connections are essentially those of a voltage divider network with the values of resistors changing with closures of the switches 68, 69, 70, 71 and 72. The conductor 119 may be connected to the base of a power transistor, to an amplifier, or to any other component or circuit wherein proportional control signals may be utilized.

Various changes and modifications may be made within this invention as will be readily apparent to those skilled in the art. Such changes and modifications are within the scope and teaching of this invention as defined by the claims appended hereto.

What is claimed is:

1. An indicator device comprising a housing portion, a movable portion supported by the housing portion for movement over a predetermined path, a plurality of magnetic field responsive switches supported by one of the portions in spaced relation to one another to define a series along the path, each switch being of a type that remains closed only while under the influence of a magnetic field, and a magnet of extended geometry supported by the other of the portions, the magnet and its extended geometry having a shape to coincide with the path of movement, whereby movement of the movable portion of the indicator device causes relative movement of the magnet adjacent the series of switches, the extended geometry of the magnet being such that once a switch in the series is closed by relative movement of the leading edge of the magnet past the switch in a forward direction, it is held closed by the extended geometry of the magnet adjacent thereto, the magnetic field from the magnet and its extended geometry being the only magnetic influence on the condition of the switches, whereby movement of the movable portion in a forward direction causes relative movement of the magnet and the switches to sequentially close the switches, each switch held closed by the extended geometry of the magnet after the leading edge of the magnet is positioned beyond the switch, and movement of the movable portion in the reverse direction causes relative movement of the magnet and the switches to open the switches in the reverse sequence as they are brought outside the influence of the magnetic field.

2. The indicator device of claim 1 wherein the movable member is responsive to variations of a sensed parameter, and including a dial overlying the path of movement of the movable member.

3. The indicator device of claim 2 including means on the housing supporting the dial for rotational movement of the dial for indexing the switches with respect to the magnet.

4. The indicator device of claim 3 wherein the switches are mounted in the dial.

5. An indicator device comprising a housing portion, a movable portion supported by the housing portion for movement over a predetermined path, a plurality of magnetic field responsive switches supported by one of the portions in spaced relationship to one another to define a series along the path, each switch being of a type that remains closed only while under the influence of a magnetic field, and a plurality of magnets supported by the other of the portions in spaced relation to one another to define a series of magnets along the path, whereby movement of the movable portion of the indicator device causes relative movement of the series of magnets adjacent the series of switches, the number and spacing of the magnets being such that once a switch in the series of switches is closed by relative movement of the first of the series of mangets past the switch in a forward direction, it is held closed by the sequential influence of the magnetic fields of the other magnets in the series, the magnetic fields from the series of magnets being the only magnetic influence on the condition of the switches, whereby movement of the movable portion in a forward direction causes relative movement of the series of magnets and switches to sequentially close the switches, each switch held closed by the magnets as they are positioned adjacent the switch, and movement of the movable member in the reverse direction causes relative movement of the series of magnets and switches to open the switches in the reverse sequence as they are brought outside the influence of the magnetic field of the first magnet in the series.

6. The indicator device of claim 2 wherein the movable member is responsive to variations of a sensed parameter and including a dial overlying the path of movement of the movable member.

7. The indicator device of claim 3 including means on the housing supporting the dial for rotational movement of the dial for indexing the switches with respect to the magnets.

8. The indicator device of claim 4 wherein the switches are mounted in the dial.

References Cited

UNITED STATES PATENTS

| 3,162,738 | 12/1964 | Abramson | 335—206 |
|---|---|---|---|
| 3,258,554 | 6/1966 | Cloup | 335—207 |
| 3,412,391 | 11/1968 | Ward | 335—206 |

OTHER REFERENCES

IBM Technical Disclosure Bulletin, Position Indicator, by W. W. Tompkins, vol. 9, No. 12, May 1967.

HAROLD BROOME, Primary Examiner

U.S. Cl. X.R.

335—207